United States Patent
Liotta et al.

(10) Patent No.: US 12,332,083 B2
(45) Date of Patent: Jun. 17, 2025

(54) MODULAR SENSOR SYSTEM FOR AUTOMATED GUIDED VEHICLES

(71) Applicant: CYNGN, INC., Menlo Park, CA (US)

(72) Inventors: Nicholas Liotta, Redwood City, CA (US); Michael Ansell, Elk Grove, CA (US); Eitan Slavik, San Francisco, CA (US); Manny LaCarrubba, San Francisco, CA (US)

(73) Assignee: CYNGN, INC., Menlo Park, CA (US)

( * ) Notice: Subject to any disclaimer, the term of this patent is extended or adjusted under 35 U.S.C. 154(b) by 71 days.

(21) Appl. No.: 18/167,005

(22) Filed: Feb. 9, 2023

(65) Prior Publication Data
US 2023/0251113 A1    Aug. 10, 2023

Related U.S. Application Data

(60) Provisional application No. 63/267,785, filed on Feb. 9, 2022.

(51) Int. Cl.
*G01D 11/24* (2006.01)
*B66F 9/075* (2006.01)

(52) U.S. Cl.
CPC .......... *G01D 11/245* (2013.01); *B66F 9/0755* (2013.01)

(58) Field of Classification Search
CPC .............................. G01D 11/24; G01D 11/245
See application file for complete search history.

(56) References Cited

U.S. PATENT DOCUMENTS

| | | | |
|---|---|---|---|
| 2012/0126000 A1* | 5/2012 | Kunzig | G06T 7/73 235/385 |
| 2012/0239238 A1 | 9/2012 | Harvey et al. | |
| 2017/0008701 A1* | 1/2017 | Terrill | B65G 1/0492 |
| 2017/0126000 A1* | 5/2017 | Numata | H01H 39/004 |

(Continued)

FOREIGN PATENT DOCUMENTS

WO    WO-2021078812 A1 *  4/2021  ............ G01S 17/86

OTHER PUBLICATIONS

International Search Report and Written Opinion of the International Searching Authority dated Jun. 6, 2023 as received in Application No. PCT/US2023/012745.

*Primary Examiner* — Jamel E Williams
(74) *Attorney, Agent, or Firm* — Maschoff Brennan

(57) ABSTRACT

A modular sensor system may include railings that connectively couple with one another. The modular sensor system may include a first compartment body that couples to the railings. The modular sensor system may include sensors positioned in an interior region or on an exterior surface of the first compartment body. In some embodiments, the railings may be connectively coupled to define an interior space that includes a shape corresponding to at least a partial perimeter shape of an industrial machine with the interior space of the modular sensor system interfacing with the industrial machine. In some embodiments, a second compartment body may be coupled to the railings. In some embodiments, the modular sensor system may include a surface panel that pivots along an axis of rotation from a first position perpendicular to the railings to a second position parallel to the railings and covering the interior space.

19 Claims, 10 Drawing Sheets

(56) References Cited

U.S. PATENT DOCUMENTS

| | | | |
|---|---|---|---|
| 2017/0233231 A1* | 8/2017 | Gariepy | G05D 1/0238 |
| | | | 701/2 |
| 2018/0208398 A1 | 7/2018 | Haveman et al. | |
| 2020/0189487 A1* | 6/2020 | McKendrick | B60R 19/483 |
| 2021/0061157 A1* | 3/2021 | Castillo | G05D 1/021 |
| 2021/0126000 A1* | 4/2021 | Fornara | G11C 17/16 |
| 2021/0276645 A1* | 9/2021 | O'Donnell | E02F 9/264 |

* cited by examiner

MODULAR SENSOR SYSTEM FOR AUTOMATED GUIDED VEHICLES

CROSS-REFERENCE TO RELATED APPLICATIONS

This application claims the benefit of U.S. Patent Application Ser. No. 63/267,785, filed on Feb. 9, 2022, the disclosure of which is incorporated herein by reference in its entirety.

FIELD OF THE INVENTION

The present disclosure generally relates to a modular sensor system for automated guided vehicles.

BACKGROUND

Sensors may be used to scan an environment in which an industrial machine is located or operates. The sensors may detect objects based on data collected by the sensors and avoid objects in a path of travel or operation of the industrial machine based on the detected objects. By positioning the sensors on a body of the industrial machine, or otherwise integrating the sensors with the industrial machine, movement or operations of the industrial machine may be automated based on the data collected by the sensors.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a modular sensor system may include two or more railings in which each of the railings is connectively coupled with one or more of the other railings. The modular sensor system may include a first compartment body that is coupled to one or more of the railings, the first compartment body including an interior region and an exterior surface. The modular sensor system may include sensors positioned in the interior region or on the exterior surface of the first compartment body.

In some embodiments, the modular sensor system may further include a second compartment body that is coupled to one or more of the railings, the second compartment body including an interior region and an exterior surface on which one or more sensors of the plurality are positioned.

In some embodiments, the railings may be connectively coupled to define an interior space that includes a shape corresponding to at least a partial perimeter shape of an industrial machine, the interior space of the modular sensor system being configured to interface with the industrial machine. The modular sensor system may further include a surface panel that is configured to pivot along an axis of rotation from a first position perpendicular to the railings to a second position parallel to the railings and covering the interior space In some embodiments, the railings may include one or more attachment features selected from a list of: cutouts, brackets, grooves, and channels, and one or more of the sensors may be attached to the railings via the attachment features. One or more of the railings may include markers that guide positioning of the sensors attached to the railings.

In some embodiments, the first compartment body may include one or more attachment features selected from a list of: cutouts, brackets, grooves, and channels. One or more of the sensors may be attached to the first compartment body via the attachment features. The first compartment body may include transparent or near-transparent coverings over one or more of the attachment features.

In some embodiments, the modular sensor system may further include one or more Light Emitting Diode (LEDs) that are positioned in the interior region or on the exterior surface of the first compartment body.

In some embodiments, the modular sensor system may further include a Human-Machine Interface (HMI) that summarizes and displays sensor information collected by the plurality of sensors.

According to an aspect of an embodiment, an autonomous vehicle may include an industrial machine that is configured to perform a task in conjunction with or as a replacement for a human performing the task. The industrial machine may be configured to move or perform the task based on receiving operation instructions. The autonomous vehicle may include a modular sensor system that is configured to collect sensor data relating to the industrial machine and provide the operation instructions autonomously to the industrial machine. The modular sensor system may include two or more railings in which each of the railings is connectively coupled with one or more of the other railings. The modular sensor system may include a first compartment body that is coupled to one or more of the railings, the first compartment body including an interior region and an exterior surface. The modular sensor system may include sensors positioned in the interior region or on the exterior surface of the first compartment body.

In some embodiments, the modular sensor system may further include a second compartment body that is coupled to one or more of the railings, the second compartment body including an interior region and an exterior surface on which one or more sensors of the plurality are positioned.

In some embodiments, the railings may be connectively coupled to define an interior space that includes a shape corresponding to at least a partial perimeter shape of an industrial machine, the interior space of the modular sensor system being configured to interface with the industrial machine. The modular sensor system may further include a surface panel that is configured to pivot along an axis of rotation from a first position perpendicular to the railings to a second position parallel to the railings and covering the interior space In some embodiments, the railings may include one or more attachment features selected from a list of: cutouts, brackets, grooves, and channels, and one or more of the sensors may be attached to the railings via the attachment features. One or more of the railings may include markers that guide positioning of the sensors attached to the railings.

In some embodiments, the first compartment body may include one or more attachment features selected from a list of: cutouts, brackets, grooves, and channels. One or more of the sensors may be attached to the first compartment body via the attachment features. The first compartment body may include transparent or near-transparent coverings over one or more of the attachment features.

In some embodiments, the modular sensor system may further include one or more Light Emitting Diode (LEDs) that are positioned in the interior region or on the exterior surface of the first compartment body.

In some embodiments, the modular sensor system may further include a Human-Machine Interface (HMI) that summarizes and displays sensor information collected by the plurality of sensors.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Industrial machines may include machines that perform repeatable tasks that may be too cumbersome or difficult for human users to perform, such as moving heavy objects from a first location to a second location. Examples of industrial machines include forklifts, excavators, cranes, dozers, cherry pickers, stock chasers, tuggers, or any other machines configured to perform industrial operations. Movements of an industrial machine are traditionally controlled by a human operator who is located in an operator compartment of the industrial machine. The human operator may make movement decisions for the industrial machine by adjusting steering, throttling, braking, and any other controls relating to operative actions that the industrial machine may be configured to perform and cause the industrial machine to execute a particular task.

Automating operations or movements of industrial machines traditionally required manufacturing autonomous industrial machines from the ground up or retrofitting existing industrial machines with additional hardware and/or software components. With respect to retrofitting existing industrial machines, modifications to the industrial machines typically involved at least partially disassembling the industrial machines to retool one or more components of the industrial machines such that the additional hardware and/or software components for autonomous operation of the industrial machine may be installed. Because the industrial machines may be at least partially disassembled to integrate autonomous operation functionality, the industrial machines may need to be decommissioned during the retrofitting process, increasing the time taken to perform operations with which the industrial machines are tasked for the duration of the retrofitting process. Furthermore, the retrofitting process may be costly to implement at large scales.

The present disclosure relates to, among other things, a modular sensor system that is configured to be coupled to existing industrial machines while making few, if any, modifications to the industrial machines. One or more aspects of the modular sensor system may be designed to interface with existing structures on the industrial machines such that disassembling and/or adjusting the industrial machines to include additional attachment components may or may not be needed. A size, shape, length, width, height, or any other parameters of the modular sensor system and/or positioning and orientation of sensors included in the modular sensor system may be readily adjustable such that the modular sensor system may be used with different industrial machines having varied geometries and/or operation constraints. Additionally or alternatively, the modular sensor system may include one or more components that facilitate communication with and/or control of the industrial machines by an autonomous operations system.

Embodiments of the present disclosure are explained with reference to the accompanying figures.

Figure 1:
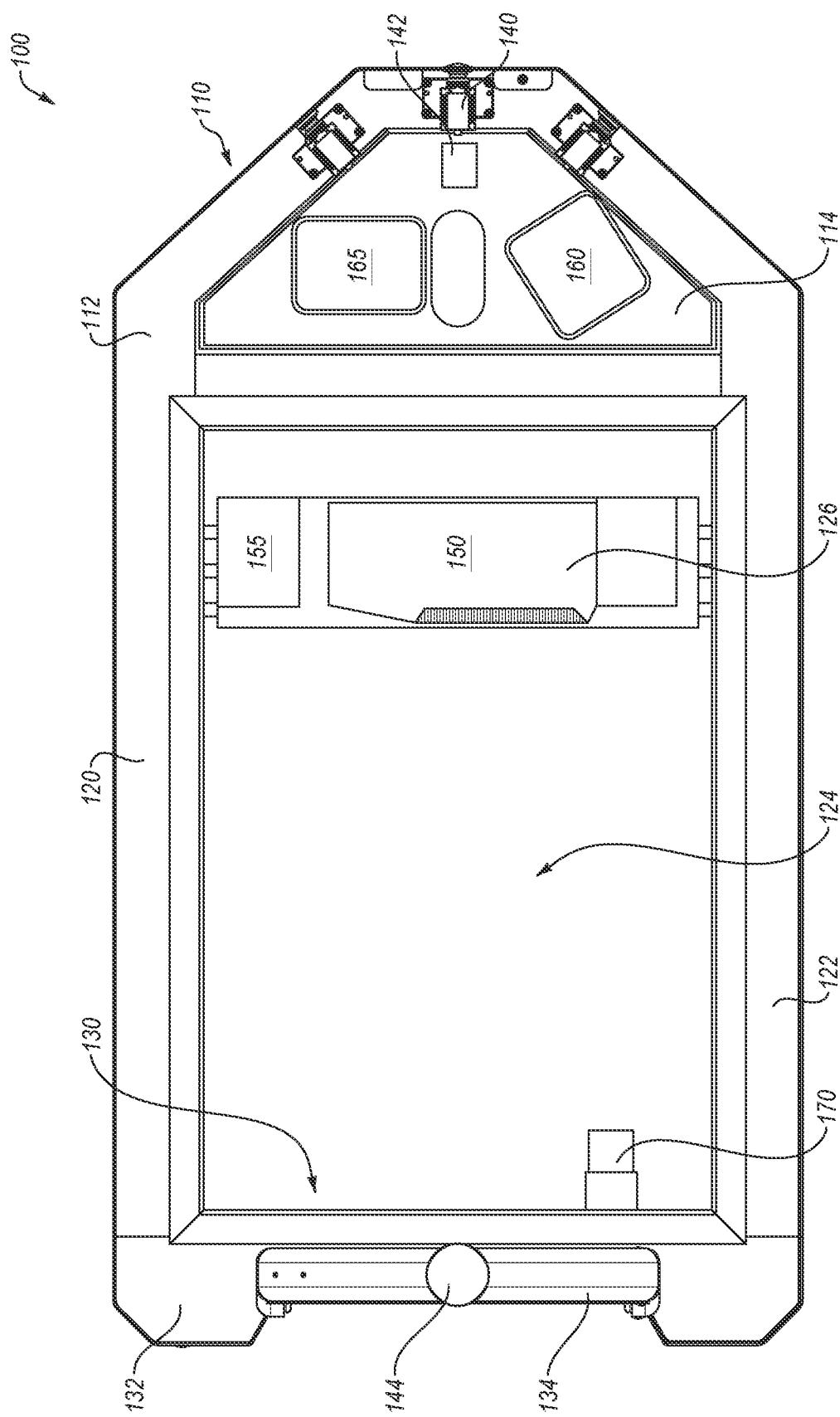
FIG. 1 is a top-down view of an example embodiment of a modular sensor system configured to be coupled with an industrial machine according to at least one embodiment of the present disclosure.

FIG. 1 is a top-down view of an example embodiment of a modular sensor system 100 configured to be coupled with an industrial machine according to at least one embodiment of the present disclosure. The modular sensor system 100 may include front compartment 110 made of a front perimeter railing 112 and a compartment body 114, one or more side railings 120, 122, and a back compartment 130 made of a back perimeter railing 132 and a compartment body 134. In some embodiments, the front compartment 110 may be attached to one or more of the side railings 120, 122, and the side railings 120, 122 may be attached to the back compartment via the back perimeter railing 132 such that the modular sensor system 100 includes a rectangular or substantially rectangular interior space 124 formed in between the connected railings. In these and other embodiments, the modular sensor system 100 may include one or more compartments 126 within the interior space 124 that provides a container and space for components of the modular sensor system 100, such as a computer 150 and/or a converter 155. Additionally or alternatively, the modular sensor system 100 may include more than the two side railings 120, 122 illustrated in FIG. 1 such that the interior space 124 includes a pentagonal, hexagonal, octagonal, or any other shape defined by the front compartment 110, the side railings (e.g., 120, 122), and the back compartment 130 based on specifications of the industrial machine to which the modular sensor system 100 is intended to be attached.

In some embodiments, the interior space 124 may correspond to an operator region of the industrial machine. In these and other embodiments, the operator may be able to manually operate the industrial machine without removal of the modular sensor system 100. In these and other implementations, using the combination of the front compartment 110, the side railings (e.g., 120, 122), and the back compartment 130, an entire surrounding view (e.g., 360 degrees) of the industrial machine may be obtained from the sensors.

For example, sensors may be disposed at a variety of locations around the modular sensor system 100 such that sensed data may be obtained fully around the industrial machine without blind spots.

In some embodiments, the modular sensor system 100 may include multiple sensors positioned in and/or on the front compartment 110, the side railings 120, 122, and/or the back compartment 130. For example, one or more image-capturing sensors (e.g., cameras) 140 may be positioned within the front perimeter railing 112 of the front compartment 110 such that the image-capturing sensors 140 are configured to capture image data in front of the modular sensor system 100. As another example, an inertial measurement unit (IMU) 142 may be positioned within the compartment body 114 of the front compartment 110 such that the IMU 142 is configured to capture specific force, angular rate, orientation, and/or any other movement information relating to the modular sensor system 100. As another example, a Light Detecting And Radar (LiDAR) sensor 144 may be coupled to an exterior surface of the compartment body 134 of the back compartment 130 such that the LiDAR sensor 144 is configured to collect spatial information with respect to the modular sensor system 100.

In these and other embodiments, the sensors included with the modular sensor system 100 may include a variety of sensors including the image-capturing sensors 140, the IMU 142, the LiDAR sensor 144, and/or any other sensors, such as time-of-flight cameras, infrared (IR) cameras, ultrasonic sensors, radar units, etc. Additionally or alternatively, the sensors may be positioned on and/or in any part of the modular sensor system 100. For example, the sensors may be coupled to a top surface of the front compartment 110 via the front perimeter railing 112 and/or the compartment body 114, a bottom surface of the front compartment, inside the side railings 120, 122, on a lateral surface of the side railings 120, 122, on a lateral surface of the perimeter railing 132, on a top surface of the perimeter railing 132, inside the compartment body 134, and/or at any other location on and/or in the modular sensor system 100. In these and other examples, the front compartment 110, the side railings 120, 122, and/or the back compartment 130 may be designed and/or tooled to facilitate mounting, insertion, or any other coupling techniques of the sensors to the modular sensor system 100. The front perimeter railing 112, for example, may include brackets, holes, protrusions, or any other features that facilitate coupling of the sensors to the front perimeter railing 112, and the compartment body 114 may include markers, grooves, notches, or any other features that guide positioning of the sensors within or on the compartment body 114. Additionally or alternatively, the front perimeter railing 112 may include view holes or other alignment features via which sensors such as the image-capturing sensor 140 and/or the LiDAR sensor 144 may be positioned to facilitate collection of sensed data.

The sensors, such as the image-capturing sensor 140, the IMU 142, and/or the LiDAR sensor 144, may be calibrated with respect to one another after being installed on the modular sensor system 100 and before attachment of the modular sensor system 100 to the industrial machine. For example, the image-capturing sensor 140 may be calibrated with respect to the IMU 142, the IMU 142 may be calibrated with respect to the LiDAR sensor 144, and the LiDAR sensor 144 may be calibrated with respect to the image-capturing sensor 140. By calibrating the sensors before attachment of the modular sensor system 100 to the industrial machine, the time taken to install the modular sensor system 100 on the industrial machine may be decreased.

Additionally or alternatively, the sensors may be calibrated after the modular sensor system 100 is installed on the industrial machine, or a combination of both. For example, an initial calibration may occur before installation, and a touch-up or tune-up calibration may be performed after installation.

The modular sensor system 100 may include multiple cutouts, brackets, grooves, channels, or any other attachment features that facilitate coupling of the sensors with the modular sensor system 100. In some embodiments, a number of attachment features included with the modular sensor system 100 may be greater than a number of sensors coupled to the modular sensor system 100 so that additional sensors may be coupled to the modular sensor system 100 without retooling the modular sensor system 100, repositioning any of the sensors previously included with the modular sensor system 100, and/or uninstalling the modular sensor system 100 from the industrial machine.

In these and other embodiments, the modular sensor system 100 may include a combination of different attachment features positioned at several positions on the surface of or within the modular sensor system 100 to accommodate different form factors associated with the sensors being coupled to the modular sensor system 100. The modular sensor system 100 may include, for example, a combination of brackets of varying sizes, grooves of varying dimensions, channels of varying widths, some combination thereof, or any other attachment features, at the same or different positions corresponding to the modular sensor system 100, such as at the front perimeter railing 112, the side railings 120, 122, and/or the back perimeter railing 132. By including multiple different attachment features, the modular sensor system 100 may be fitted with a variety of different sensors depending on the sensing-capability requirements of a given industrial machine. Additionally or alternatively, including the multiple different attachment features may facilitate retroactive replacement of sensors previously attached to the modular sensor system 100 without needing to remove the modular sensor system 100 from the industrial machine.

In some embodiments, the modular sensor system 100 may be made of various materials, such as metals, plastics, etc. In some embodiments, the modular sensor system 100 may be made of mixed materials. For example, the modular sensor system 100 may include a base substrate made of a metal, such as steel, aluminum, or titanium, and casings for the base substrate that define the front compartment 110, the side railings 120, 122, and/or the back compartment 130 made of a blow-molded or injection-molded hard plastic, such as polypropylene, polyethylene terephthalate, nylon, or polycarbonate. In this and other examples, the plastic casings of the various components may be replaceable such that a plastic casing damaged during operations of the industrial machine may be removed and a new plastic casing may be installed in place of the damaged casing. Additionally or alternatively, the components of the modular sensor system 100 may be made of metal with plastic coverings over any cutouts in the components such that sensors aligned with the cutouts may be protected during operations of the industrial machine and the plastic coverings may be transparent or near-transparent to the sensors for acquisition of sensed data while still providing protection. The plastic coverings may also function as light diffusers for LED lights or other lighting aligned with the cutouts, or for the entire modular sensor system 100 or portions thereof (e.g., the entire side railings 120/122 may be illuminated and diffused by the plastic covering). In these and other embodiments, such illumination may correspond to an associated vehicle operating, moving, a speed at which it is moving, etc.

The modular sensor system 100 may be attached to an industrial machine. For example, the modular sensor system 100 may be bolted on using existing bolt holes, may snap over industrial machine housing, or may otherwise be fixedly coupled to the industrial machine. In such a circumstance, movement and/or orientation of the modular sensor system 100 corresponds to movement and/or orientation of the industrial machine. As such, the information relating to the modular sensor system 100 collected by the sensors may correspond to sensor information collected as if the sensors were coupled to the industrial machine directly rather than being coupled to the industrial machine via the modular sensor system 100. For example, steering of a particular industrial machine that includes the modular sensor system 100 may affect a corresponding movement (e.g., a leftward curving motion) and/or rotation (e.g., a counterclockwise reorientation) of the modular sensor system 100 such that any information collected by the sensors of the modular sensor system 100 are also relevant for the industrial machine.

In some embodiments, the modular sensor system 100 may include one or more components for facilitating integration of the modular sensor system 100 with an industrial machine to allow the modular sensor system 100 to connect with computer systems involved in operations and/or control of the industrial machine. By connecting with the computer systems of the industrial machine, the modular sensor system 100 may facilitate collection of data relating to movement, operations, and/or surroundings of the industrial machine via the sensors coupled to the modular sensor system 100.

Additionally or alternatively, the modular sensor system 100 may be configured to communicate with and/or control the industrial machine using an autonomous driving and operations system. The modular sensor system 100 may include the computer 150 paired with the converter 155 (e.g., a DC/DC converter) in which the computer 150 is configured to obtain the sensor data collected by the sensors of the modular sensor system 100 and direct one or more operations of the industrial machine to which the modular sensor system 100 is attached with or without input from a human operator. In some embodiments, the computer 150 may send instructions to one or more electronic control units (ECU) 160, and the ECU 160 may direct one or more operations of the industrial machine. For example, a particular ECU may be coupled to a steering system of the industrial machine such that the particular ECU is configured to obtain instructions relating to steering the industrial machine and implement the instructions using the steering system of the industrial machine. In this and other examples, additional ECUs or the same particular ECU may be coupled to a throttling system, a braking system, a component movement system, or any other operation systems of the industrial machine such that the ECUs 160 may control the operations of the industrial machine. In some embodiments, the ECU 160 may include a single connection from the modular sensor system 100 and the control systems of the industrial machine, such as by using a multi-wire connection with at least one wire dedicated to each of a throttling system, a braking system, a wheel-turning system, among other systems. In these and other embodiments, the modular sensor system 100 may include an electricity modulation unit 165, such as a fuse box or an electrical panel, that prevent electrical overload of the computer 150, the converter 155, and/or the ECU 160.

In some embodiments, the modular sensor system 100 may include one or more actuators 170 that are configured to implement instructions, such as from the computer 150, involving movement or rotation of the sensors with or without additional input from a human operator of the industrial machine. For example, the image-capturing sensors 140 may be mounted on a rotatable base piece, and the actuator 170 may affect rotation of the rotatable base piece in response to receiving a particular signal from the computer 150. As another example, the LiDAR sensor 144 may be mounted on a retractable structure such that a height of the LiDAR sensor 144 may be adjusted by the actuator 170 responsive to receiving a particular signal from the computer 150. In some embodiments, such movement may facilitate calibration or re-calibration of the sensors relative to each other or relative to the industrial machine more generally.

Additionally or alternatively, the actuator 170 may be configured to implement instructions involving movement, rotation, or other operations of the industrial machine to which the modular sensor system 100 is attached. As such, the actuator 170 may supplement instructions to the industrial machine input by a human user or replace the human user altogether in executing instructions for operating the industrial machine. For example, the actuator 170 may execute instructions obtained from an autonomous operations system based on sensor data collected by the sensors of the modular sensor system 100 that involve controlling throttling, braking, steering, or any other operations of the industrial machine to which the modular sensor system 100 is attached.

In some embodiments, controlling the operations of the industrial machine by the actuator 170 may be facilitated by one or more robotic components. For example, a given robotic component may include a robotic arm that is configured to rotate a steering wheel of the industrial machine in response to instructions provided by the computer 150. As an additional or alternative example, a given robotic component may include a piston that is configured to depress a gas pedal and/or brake in response to instructions provided by the computer 150. Additionally or alternatively, the actuator 170 may be configured to control operations of the industrial machine without using any robotic components. For example, the steering wheel, the gas pedal, the brake, and/or any other components of the industrial machine may be configured to operate autonomously in response to instructions provided by the computer 150.

Although the modular sensor system 100 is illustrated with respect to a stock chaser, it is contemplated that the modular sensor system 100 may be configured and/or designed to be implemented with other industrial machines. For example, a modified version of the modular sensor system 100 may be implemented as a modular sensor system 410 that may be attached to a forklift 420 as described in relation to FIGS. 6A and 6B. As another example, the modular sensor system 100 may be implemented with respect to an excavator, a crane, a mining machine, a cherry picker, or any other industrial machine.

Modifications, additions, or omissions may be made to the modular sensor system 100 without departing from the scope of the present disclosure. For example, the designations of different elements in the manner described is meant to help explain concepts described herein and is not limiting. For instance, in some embodiments, the image-capturing sensors 140, IMU 142, LiDAR sensor 144, front compartment 110, side railings 120, 122, and back compartment 130 are delineated in the specific manner described to help with explaining concepts described herein but such delineation is not meant to be limiting. Further, the modular sensor system 100 may include any number of other elements or may be implemented within other systems or contexts than those described.

Figure 2:
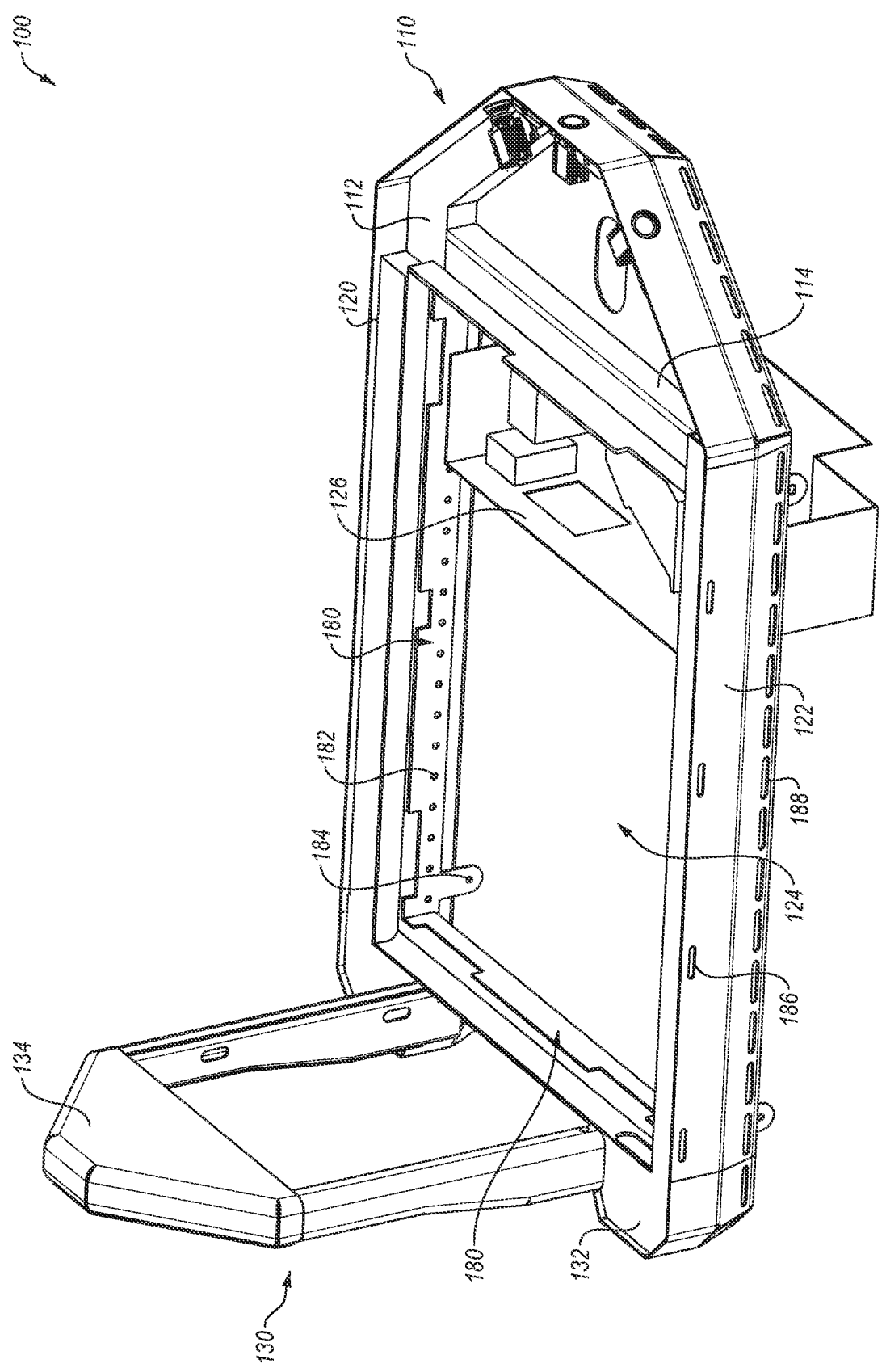
FIG. 2 is a perspective view of the example embodiment of the modular sensor system of FIG. 1 according to at least one embodiment of the present disclosure.

FIG. 2 is a perspective view of the example embodiment of the modular sensor system 100 according to at least one embodiment of the present disclosure. As illustrated in FIG. 2, the modular sensor system 100 may include mounting components 180 that facilitate attachment of the modular sensor system 100 to industrial machines of varying specifications. In some embodiments, the mounting components 180 may include a series of openings 182 with each opening being positioned adjacent to one another. Because different industrial machines may have different size specifications and/or different positions of attachment components (e.g., screws, bolts, nuts, openings for fasteners, brackets, etc.), the openings 182 may facilitate attachment of the modular sensor system 100 to a wide variety of industrial machines by providing more attachment options via the mounting components 180. Additionally or alternatively, the mounting components 180 may include one or more attachment tabs 184 that may be configured to be inserted into and/or fastened with corresponding parts of different industrial machines.

In these and other embodiments, other components of the modular sensor system 100 may include features that facilitate attachment of the modular sensor system 100 to different industrial machines. For example, mounting slots 186 may be included along a top portion of the lateral surface of the side railings 120, 122. As another example, a series of openings 188 may be positioned along a bottom portion of the lateral surface of the side railings 120, 122. In this and other examples, the mounting slots 186 and/or the openings 188 may be used to facilitate attachment of the modular sensor system 100 to particular industrial machines via different attachment features of the particular industrial machines and/or providing feedback or guidance when installing or attaching the modular sensor system 100 to an industrial machine. For example, light-emitting diodes (LEDs) configured to emit different colored lights may be positioned behind the openings 188 to indicate whether the modular sensor system 100 has been properly positioned with respect to a particular industrial machine (e.g., a red light is emitted indicating the modular sensor system 100 has not been fastened yet to the particular industrial machine). For example, the red LEDs may remain lit or blink until the modular sensor system 100 is properly mounted on a given industrial machine, and in response to the modular sensor system 100 being properly mounted or seated, a green LED may light up. Additionally or alternatively, the mounting slots 186 and/or the openings 188 may provide more apertures from which sensors may be oriented to collect sensor information and reduce blind spots around the modular sensor system 100.

Modifications, additions, or omissions may be made to the modular sensor system 100 without departing from the scope of the present disclosure. For example, the designations of different elements in the manner described is meant to help explain concepts described herein and is not limiting. For instance, in some embodiments, the mounting components 180, openings 182, attachment tabs 184, mounting slots 186, and openings 188 are delineated in the specific manner described to help with explaining concepts described herein but such delineation is not meant to be limiting. Further, the modular sensor system 100 may include any number of other elements or may be implemented within other systems or contexts than those described.

Figure 3:
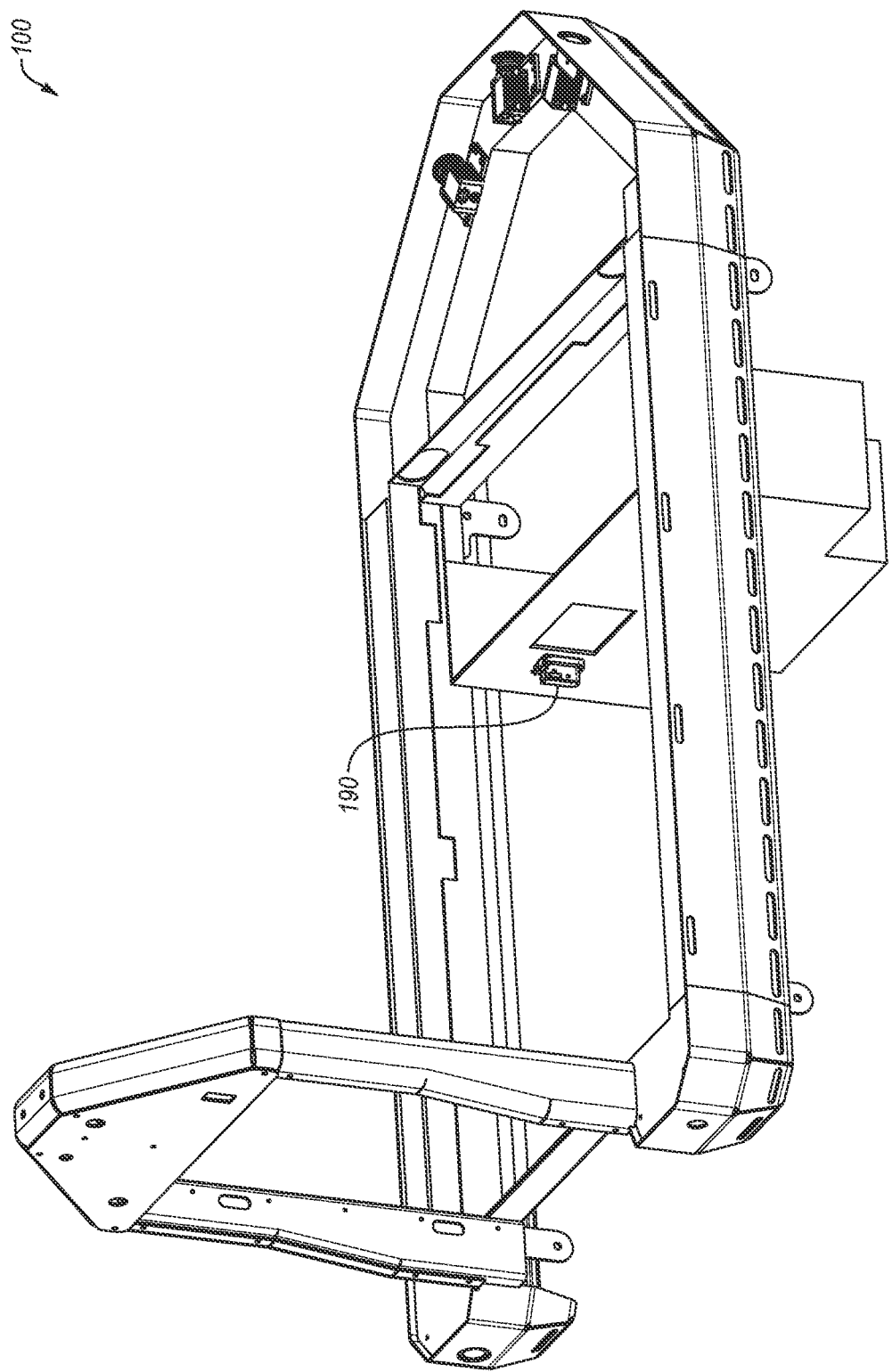
FIG. 3 is a perspective view of the example embodiment of the modular sensor system of FIG. 1 according to at least one embodiment of the present disclosure.

FIG. 3 is a perspective view of the example embodiment of the modular sensor system 100 according to at least one embodiment of the present disclosure. In some embodiments, the modular sensor system 100 may include a system interface port 190 to which a computer system and/or control system of the industrial machine may connect. The system interface port 190 may include one or more connection ports such that multiple computer systems and/or control systems of the industrial machine may be connected to the modular sensor system 100. For example, wires corresponding to a power system, a steering input, a throttle input, an enable forward/reverse input, and/or a grounding system of the industrial machine may be connected to the system interface port 190 such that the modular sensor system 100 and/or an autonomous operations system corresponding to the modular sensor system 100 are communicatively coupled to the various systems of the industrial machine. In this and other examples, the autonomous operations system may process data collected by the sensors of the modular sensor system 100 and send instructions to the power system, the steering input, the throttle input, the enable forward/reverse input, and/or the grounding system to control operations of the industrial machine without input from a human user. Additionally or alternatively, the modular sensor system 100 may receive feedback from one or more of the systems of the industrial machine via the system interface port 190. For example, the steering input system may provide feedback of how far to one side or the other the vehicle is currently turned, or the throttle input system may provide feedback of the current level of the throttle.

Figure 4:
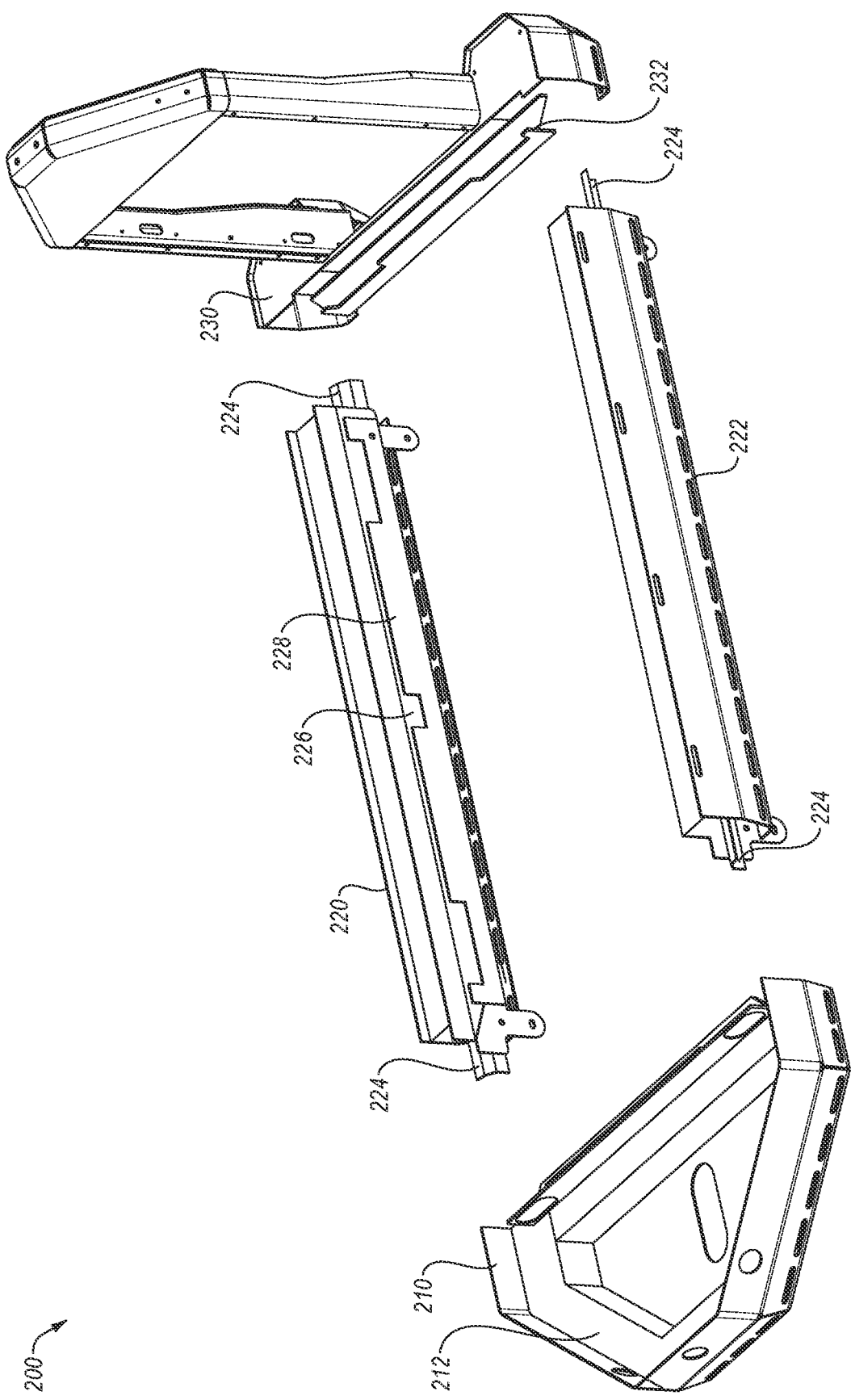
FIG. 4 illustrates an example embodiment of a modular sensor system that is configured to adjust one or more dimensions according to at least one embodiment of the present disclosure.

FIG. 4 illustrates an example embodiment of a modular sensor system 200 that includes one or more adjustable dimensions according to at least one embodiment of the present disclosure. The modular sensor system 200 may include a front compartment 210, two or more side railings 220, 222, and a back compartment 230 in which the front compartment 210, the side railings 220, 222, and/or the back compartment 230 may be the same as or similar to the front compartment 110, the side railings 120, 122, and/or the back compartment 130, respectively, as described in relation to FIGS. 1 and 2. In some embodiments, each of the side railings 220, 222 may include one or more connection tabs 224 that facilitates attachment of the side railings 220, 222 to the front compartment 210 and/or the back compartment 230. Additionally or alternatively, the front compartment 210 and/or the back compartment 230 may include connection tabs or other features (not shown) that facilitate attachment of the front compartment 210 and/or the back compartment 230 with the side railings 220, 222.

In some embodiments, a length of the side railings 220, 222 and/or a length of the front compartment 210 and/or the back compartment 230 may be adjustable such that an overall length and/or width of the modular sensor system 200 may be changed to improve fitting of the modular sensor system 200 on a particular industrial machine. The side railings 220, 222 may include a bar 226 that extends through a casing 228 in which the bar and/or the casing 228 may be retractable or extendible such that the length of the side railings 220, 222 may be changed depending on the dimensions of the particular industrial machine to which the modular sensor system 200 is attached. Additionally or alternatively, the side railings 220, 222 may include two or more detachable components in which each of the detachable components may be connected to one another to adjust a length and/or shape of the side railings 220, 222. Additionally or alternatively, the front compartment 210 and/or the back compartment 230 may be made of two (or more) detachable and/or extendible pieces such that a length and/or size of the front compartment 210 and/or the back compartment 230 may be increased or decreased.

In some embodiments, the front compartment 210, the side railings 220, 222, and/or the back compartment 230 may be detached from the modular sensor system 200 and attached to the industrial machine as a discrete component. Having one or more of the front compartment 210, the side railings 220, 222, and/or the back compartment 230 be configured to operate as discrete sensor components may improve flexibility in positioning the front compartment 210, the side railings 220, 222, and/or the back compartment 230 based on space and/or geometrical considerations relating to the industrial machine. In these and other embodiments, each of the detachable components may include connection outlets that facilitate connecting one or more controls and/or operations systems of the industrial machine with the detachable components so that the industrial machine and the modular sensor system 200 are communicatively coupled (e.g., rather than a single port 190 shown in FIG. 3, each discretely attachable component may include its own port). Additionally or alternatively, each of the detachable components may include an Ethernet, local area network (LAN), a controlled area network (CAN), or other general input/output (I/O) connectivity with the other components of the modular sensor system 200 and/or an autonomous operations system such that any sensor data collected by the discrete component may be analyzed in combination with sensor data collected by the other components. Additionally or alternatively, controls or commands may be provided to the industrial machine across a single port while using the input from multiple discrete components.

In these and other embodiments, adjusting a length and/or a positioning of one or more of the detachable components may facilitate adjusting a position and/or orientation of the sensors included with the modular sensor system 200 without reinstalling the modular sensor system 200 on the industrial machine. For example, adjusting a length of the side railings 220, 222 may result in a corresponding positional movement of one or more sensors (e.g., image-capturing sensors) coupled to the side railings 220, 222. Additionally or alternatively, the position and/or orientation of the sensors included with the modular sensor system 200 may be adjusted without changing the length and/or the positioning of the detachable components. For example, the sensors may be coupled to the bar 226 extending through the casing 228 of the side railings 220, 222 such that sliding the bar 226 through the casing 228 may change the positions of the sensors without changing the length of the side railings 220, 222 themselves. As another example, a similar bar and/or track may be included in a channel 212 of the front compartment 210 and/or a channel 232 of the back compartment 230 such that sensors installed within the channel 212 and/or the channel 232 may be moved and/or reoriented with or without adjusting the front compartment 210 and/or the back compartment 230 themselves.

Modifications, additions, or omissions may be made to the modular sensor system 200 without departing from the scope of the present disclosure. For example, the designations of different elements in the manner described is meant to help explain concepts described herein and is not limiting. For instance, in some embodiments, the front compartment 210, side railings 220, 222, and/or back compartment 230 are delineated in the specific manner described to help with explaining concepts described herein but such delineation is not meant to be limiting. Further, the modular sensor system 200 may include any number of other elements or may be implemented within other systems or contexts than those described.

Figure 5:
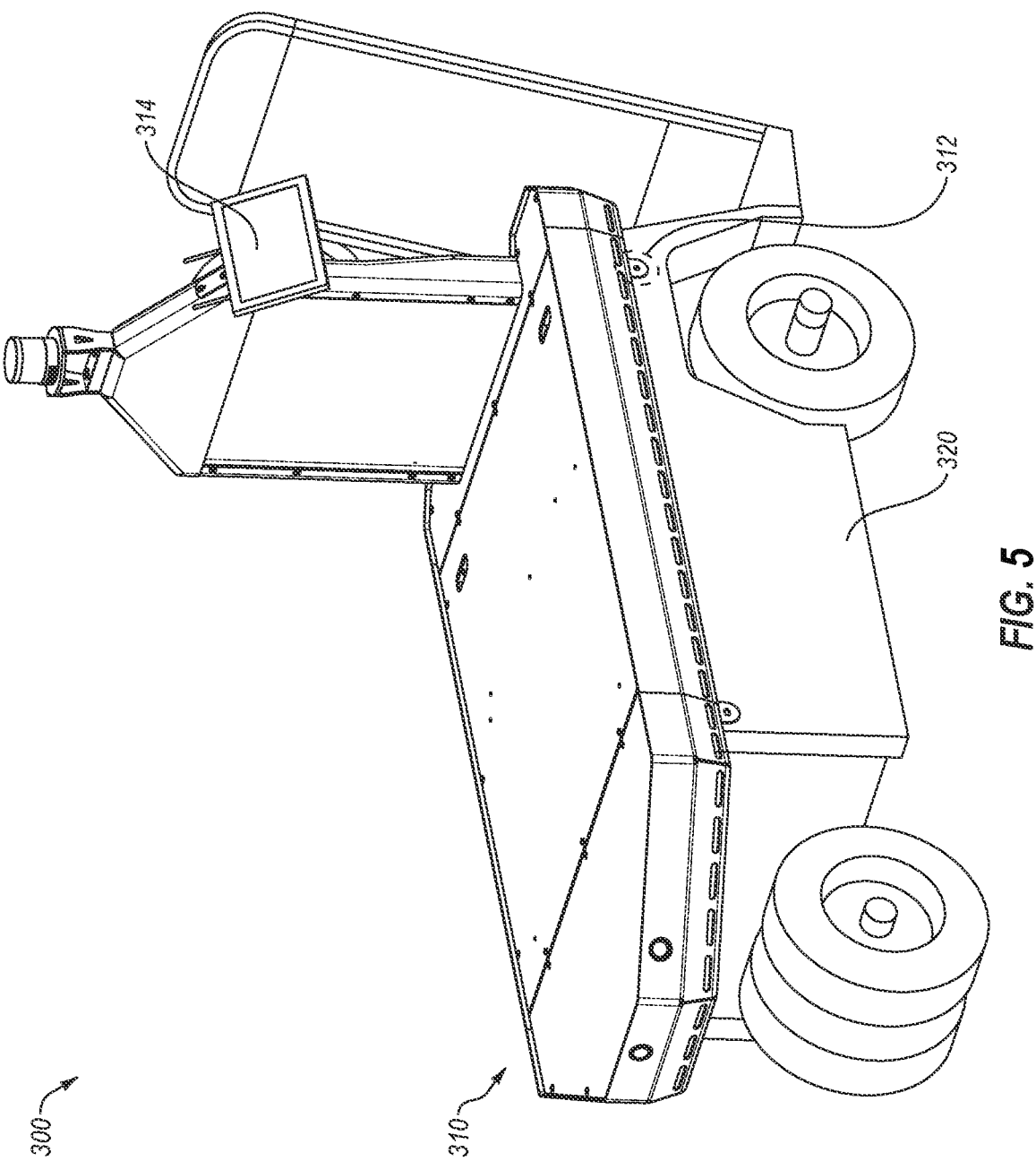
FIG. 5 illustrates an autonomous industrial machine that includes a stock chaser equipped with the modular sensor system of FIG. 1 according to at least one embodiment of the present disclosure.

FIG. 5 illustrates an autonomous industrial machine 300 that includes a stock chaser 320 equipped with a modular sensor system 310 according to at least one embodiment of the present disclosure. In some embodiments, the modular sensor system 310 may be mounted to the stock chaser 320 around a circumferential surface of the stock chaser 320 and/or along a top surface of the stock chaser 320. The modular sensor system 310 may be the same as or similar to the modular sensor system 100 and/or the modular sensor system 200 described in relation to FIGS. 1 and 2, respectively. As illustrated in FIG. 5, the modular sensor system 310 may be attached to the stock chaser 320 via one or more attachment points 312. In some embodiments, the attachment points 312 may include an interface between one or more attachment features already present on the stock chaser 320 and one or more features of the modular sensor system 310, such as openings of attachment tabs (e.g., the attachment tabs 184 as described in relation to FIG. 2).

In some embodiments, the modular sensor system 310 may include one or more components for presenting information to a human user or with which the human user may interact. For example, the modular sensor system 310 may include a human-machine interface (HMI) display 314 that summarizes sensor information collected by the modular sensor system 310 for the human user, current path traveled, predicted path, system status, and/or any other data. Additionally or alternatively, the HMI display 314 may provide a graphical user interface (GUI) with which the human user may interact to control one or more parameters relating to operations of the stock chaser 320 such as indicating a travel destination for the stock chaser 320 and/or instructing the stock chaser 320 to shut down autonomous operations.

Figure 6A:
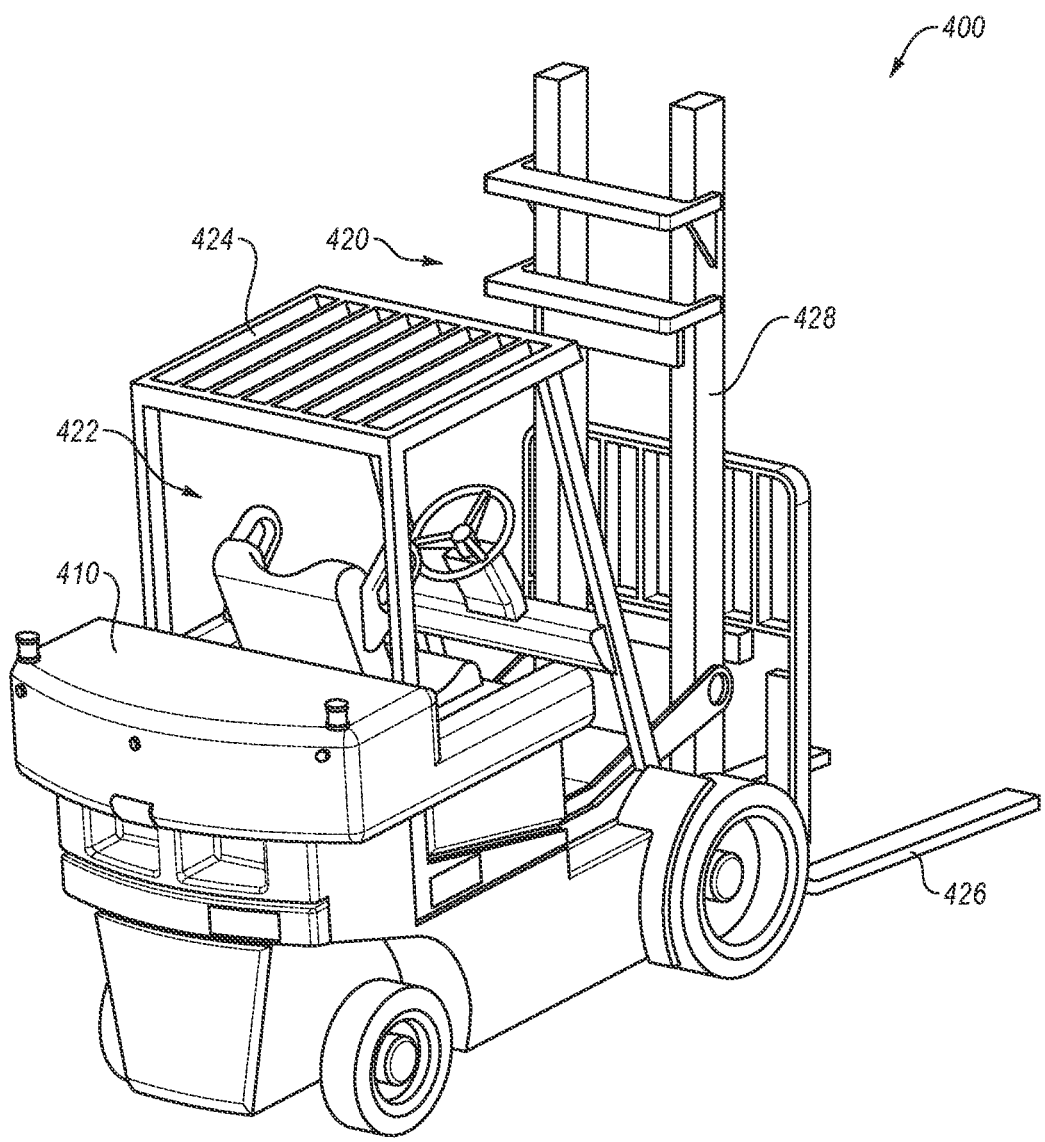
FIGS. 6A-6B illustrate an autonomous industrial machine that includes a forklift equipped with a modular sensor system according to at least one embodiment of the present disclosure.
Figure 6B:
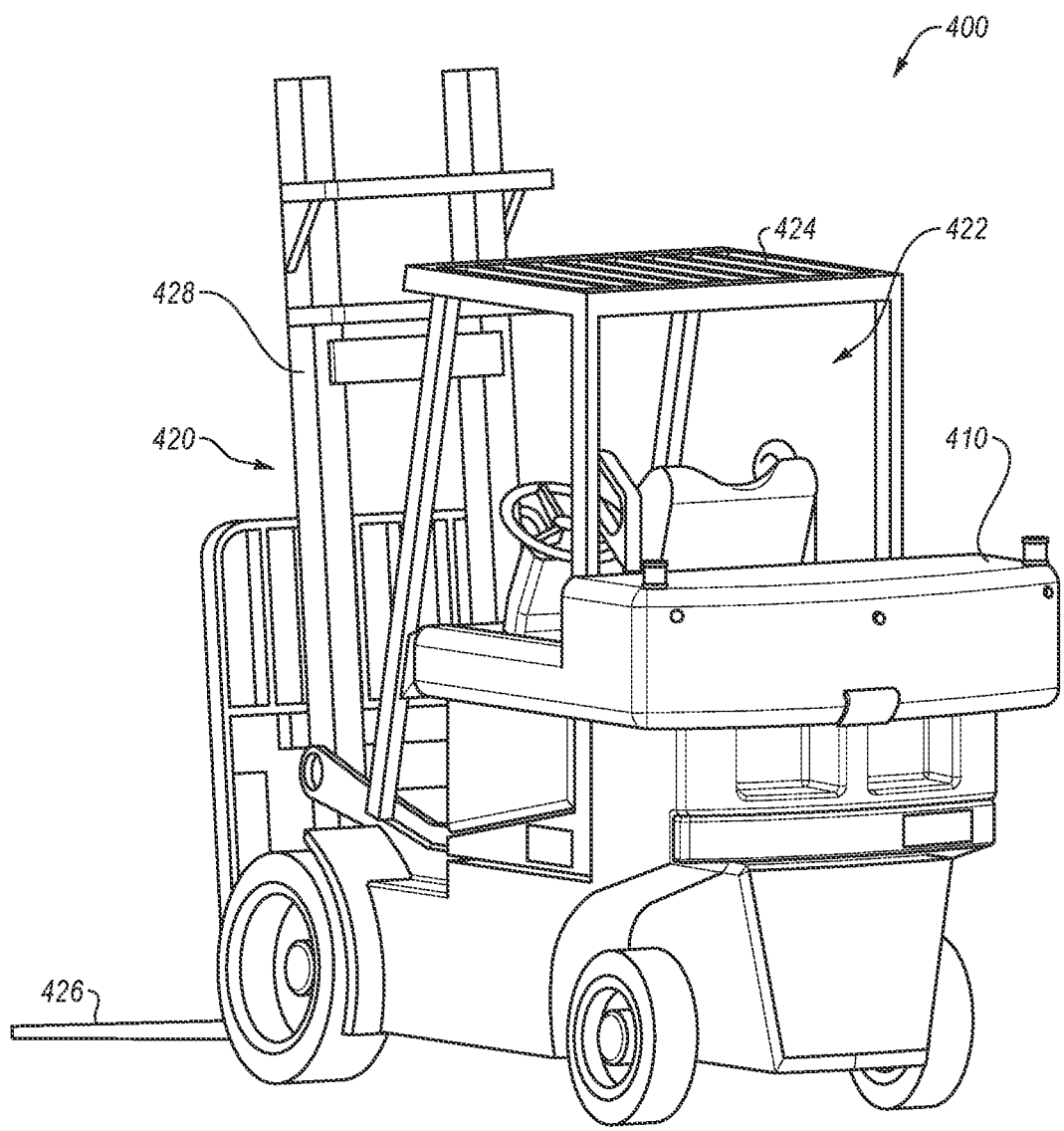

FIGS. 6A-6B illustrate an autonomous industrial machine 400 that includes a forklift 420 equipped with a modular sensor system 410 according to at least one embodiment of the present disclosure. The modular sensor system 410 may include sensors and/or mounting components that are the same as or similar to those of the modular sensor system 100 and/or the modular sensor system 200 described in relation to FIGS. 1 and 2, respectively. In some embodiments, the modular sensor system 410 may be attached to a backwards-facing surface of the forklift 420 behind a driver compartment 422 of the forklift 420 such that sensors of the modular sensor system 410 may be positioned to collect data relevant to movement, orientation, and/or operations of the forklift 420. In these and other embodiments, positioning and attachment of the modular sensor system 410 with respect to the forklift 420 may depend on attachment features available on the forklift 420. For example, the forklift 420 may include one or more attachment features along a top surface 424 of the driver compartment 422 such that the modular sensor system 410 may be mounted on the top surface 424.

Additionally or alternatively, the modular sensor system 410 may include multiple components as described in relation to the modular sensor system 200 of FIG. 4 to account for structural and operational features of the forklift 420. For example, one or more components of the modular sensor system 410 may be attached to forks 426 and/or a mast 428 of the forklift 420 to facilitate collection of sensor data relating to lifting operations. As another example, components of the modular sensor system 410 may be positioned away from the forks 426 and/or the mast 428 to prevent interference between sensor data relating to the lifting operations of the forklift 420 and sensor data relating to movement and/or orientation of the forklift 420 itself.

Figure 7A:
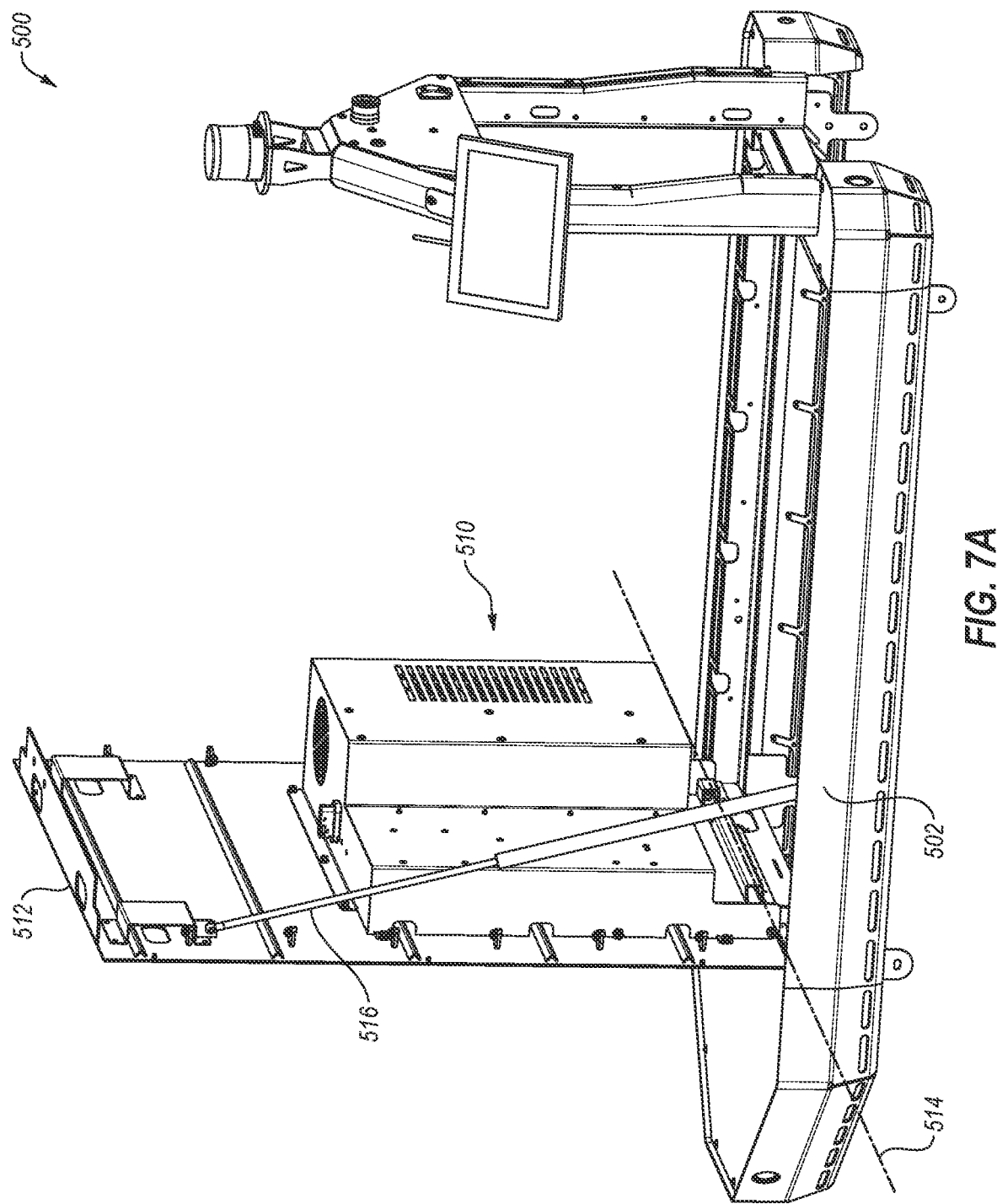
FIGS. 7A-7C illustrate an example embodiment of a modular sensor system that includes a hinged compartment for components of the modular sensor system according to one or more embodiments of the present disclosure.
Figure 7B:
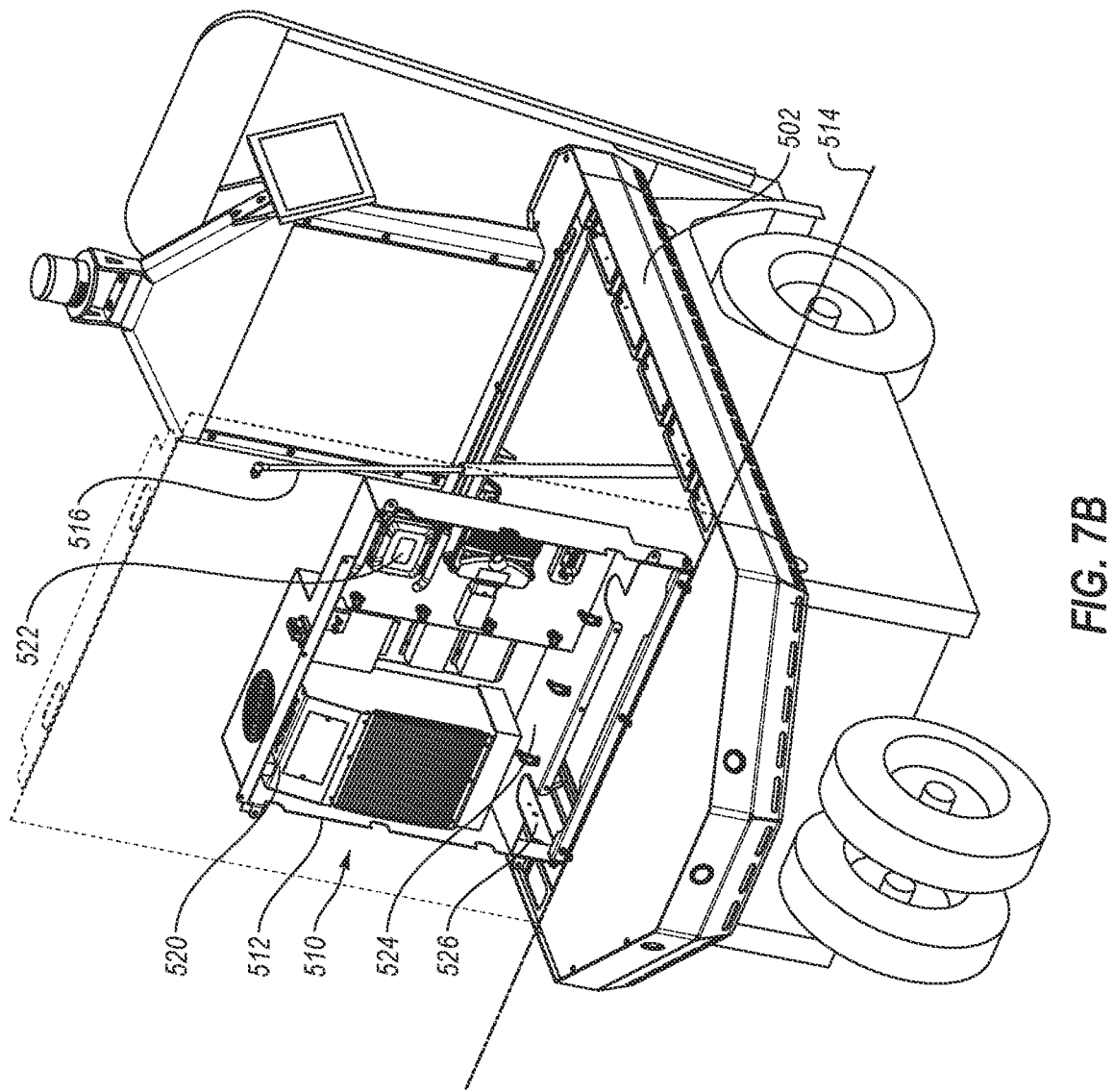
Figure 7C:
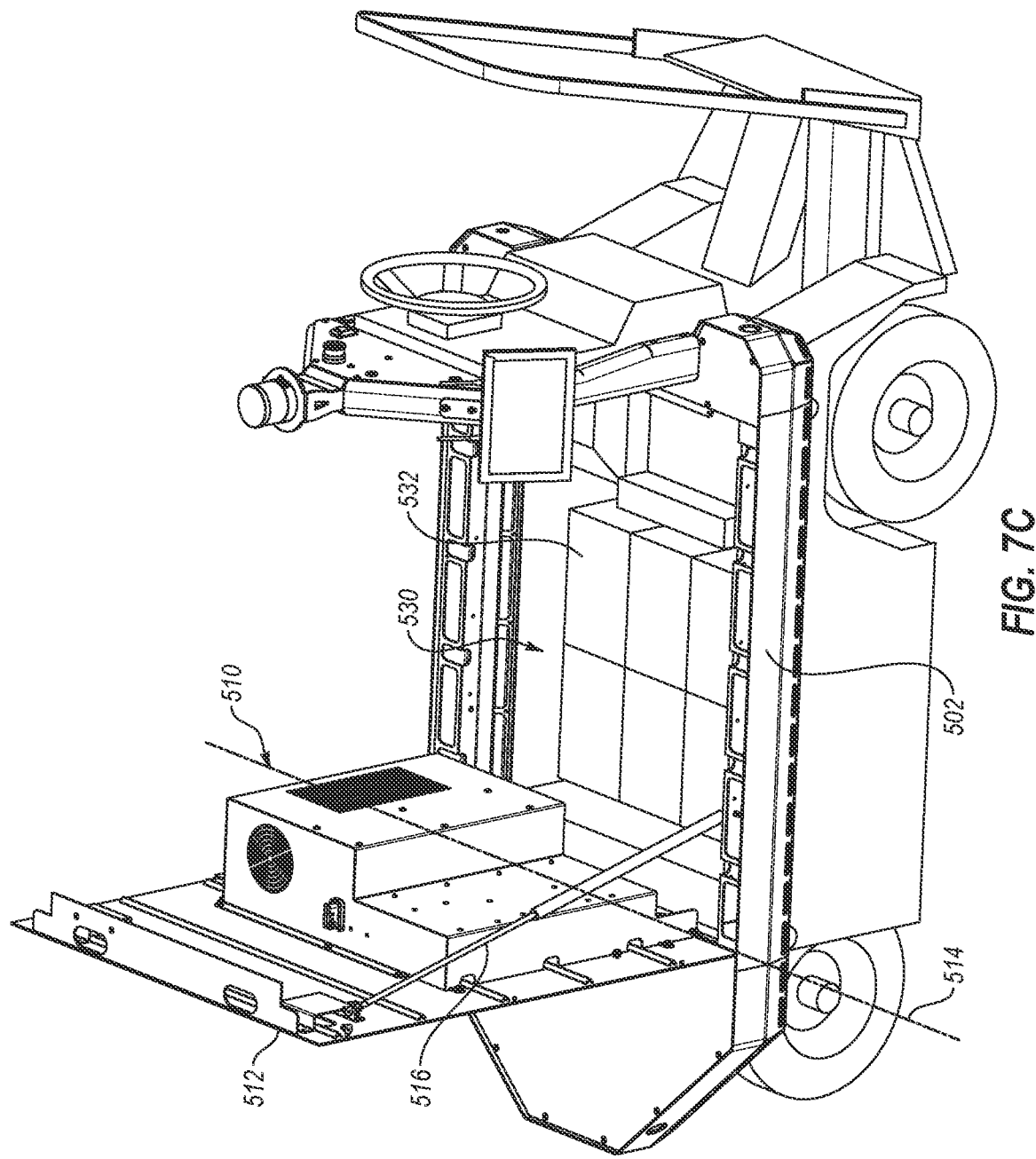

FIGS. 7A-7C illustrate an example embodiment of a modular sensor system 500 that includes a compartment 510 for components of the modular sensor system 500 according to one or more embodiments of the present disclosure. The modular sensor system 500 depicted in FIGS. 7A-7C may include components that facilitate autonomous operation of an industrial vehicle to which the modular sensor system 500 is attached. For example, the modular sensor system 500 may include image-capturing sensors, IMU sensors, LIDAR sensors, a computer, a converter, ECUs, electricity modulation units, and/or actuators that are the same as or similar to those included with the modular sensor system 100 as described in relation to FIG. 1.

In some embodiments, the modular sensor system 500 may include the compartment 510, which is attached to a surface panel 512 that is configured to pivot with respect to an axis 514. The surface panel 512 may begin in a position perpendicular to side railings 502 of the modular sensor system 500 as depicted in FIGS. 7A-7C, and the surface panel 512 may pivot along the axis 514 to reach a closed position in which the surface panel 512 is parallel to the side railings 502. From the closed position, a user may manually push the surface panel 512, such as by interacting with a tab and/or a lever attached to the surface panel 512 or interacting with an edge of the surface panel 512, to pivot the surface panel 512 back to the starting position. In these and other embodiments, the compartment 510 may include a shock spring 516 that couples the surface panel 512 to one or more of the side railings 502 and allows the surface panel 512 to pivot at a controlled pace so that components included in the compartment 510 are not damaged during movement of the surface panel 512.

Electronic and actuation components may be placed in the compartment 510. For example, FIG. 7B illustrates the modular sensor system 500 in which electronic components, including a computer 520 that is the same as or similar to the computer 150 of FIG. 1 and a converter 522 that is the same as or similar to the converter 155 of FIG. 1, are placed in an interior space of the compartment 510. In some embodiments, one or more walls 524 of the compartment 510 may include openings 526 through which wires corresponding to the computer 520 and/or the converter 522 may extend to couple the computer 520 and/or the converter 522 to other components of the industrial machine, such as the stock chaser illustrated in FIGS. 7B-7C.

Configuring the modular sensor system 500 to include the compartment 510 and the surface panel 512 may introduce different placement configurations for components that facilitate autonomous operation of the industrial machine. As illustrated in FIG. 7C, setting the surface panel 512 and the compartment 510 in an open position (i.e., so that the surface panel 512 is perpendicular to the side railings 502) may allow access into an interior space 530 of the industrial machine in which components corresponding to the modular sensor system 500 and/or the industrial machine to which the modular sensor system 500 is coupled may be placed. For example, the interior space 530 may include one or more batteries 532 that power operations of the industrial machine and/or the modular sensor system 500. Because the surface panel 512 and the compartment 510 are capable of pivoting about the axis 514, accessing the interior space 540 may be easier than in other configurations of the modular sensor system, such as the modular sensor system 100 illustrated in FIG. 1.

Although the modular sensor system 500 is illustrated with respects to FIGS. 7A-7C as including the compartment 510 and the surface panel 512 being pivotable with respect to the axis 514, the geometry and/or orientation of the compartment 510, the surface panel 512, the axis 514, some combination thereof, or any other element of the modular sensor system 500 may be modified based on the industrial machine to which the modular sensor system 500 is to be attached. For example, implementing the pivotable compartment 510 and/or the surface panel 512 with the modular sensor system 410 may involve configuring one or more surfaces of the modular sensor system 410 to be pivotable with respect to some axis and to include a compartment that is the same as or similar to the compartment 510.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A modular sensor system, comprising:
a plurality of railings in which each railing is coupled to another railing, wherein the plurality of railings comprise mounting slots or openings configured to facilitate attachment of the modular sensor system to an industrial machine;
a compartment body coupled to the plurality of railings, the compartment body comprising an interior region and an exterior surface;
a plurality of sensors positioned in the interior region or on the exterior surface of the compartment body; and
a light emitting diode configured to emit different colored lights to indicate whether the modular sensor system is coupled to the industrial machine,
wherein the modular sensor system is configured to couple to the industrial machine via the plurality of railings or the compartment body.

2. The modular sensor system of claim 1, wherein the compartment body comprises a first compartment body, the modular sensor system comprises a second compartment body coupled to the plurality of railings, the second compartment body comprising an interior region and an exterior surface on which the plurality of sensors are positioned.

3. The modular sensor system of claim 1, wherein the plurality of railings are coupled to each other to define an interior space comprising a shape corresponding to at least a partial perimeter shape of the industrial machine, the interior space of the modular sensor system being configured to interface with the industrial machine.

4. The modular sensor system of claim 3, further comprising a surface panel configured to pivot around an axis of rotation from a first position that is perpendicular to the plurality of railings to a second position that is parallel to the plurality of railings, wherein the surface panel at least partially covers the interior space in the second position.

5. The modular sensor system of claim 1, wherein:
the plurality of railings comprise an attachment feature selected from at least one of: a cutout, a bracket, a groove, or a channel; and
the plurality of sensors are attached to the plurality of railings via the attachment feature.

6. The modular sensor system of claim 1, wherein the plurality of railings comprise a plurality of markers configured to guide positioning of the plurality of sensors relative to the plurality of railings.

7. The modular sensor system of claim 1, wherein:
the compartment body comprises an attachment feature selected from at least one of: a cutout, a bracket, a groove, or a channel; and
the plurality of sensors are attached to the compartment body via the attachment feature.

8. The modular sensor system of claim 7, wherein the compartment body comprises a transparent or near-transparent covering over the attachment feature.

9. The modular sensor system of claim 1, further comprising a Human-Machine Interface (HMI) configured to summarize or display sensor information collected by the plurality of sensors.

10. An autonomous vehicle, comprising:
an industrial machine configured to perform a task in conjunction with or as a replacement for a human performing the task, the industrial machine being configured to perform the task based on receiving operation instructions from a human operator; and
a modular sensor system configured to collect sensor data relating to the industrial machine and provide automated operation instructions to the industrial machine without human operation instructions, the modular sensor system comprising:
a plurality of railings in which each railing is coupled to another railing;
a compartment body coupled to the plurality of railings, the compartment body comprising an interior region and an exterior surface; and
a plurality of sensors positioned in the interior region or on the exterior surface of the compartment body,
wherein:
the modular sensor system is configured to couple to the industrial machine via the plurality of railings or the compartment body; and
the plurality of railings comprise a plurality of markers configured to guide positioning of the plurality of sensors relative to the plurality of railings.

11. The autonomous vehicle of claim 10, wherein the compartment body comprises a first compartment body and the modular sensor system comprises a second compartment body coupled to the plurality of railings, the second compartment body comprising an interior region and an exterior surface on which the plurality of sensors are positioned.

12. The autonomous vehicle of claim 10, wherein the plurality of railings are coupled to each other to define an interior space comprising a shape corresponding to at least a partial perimeter shape of the industrial machine, the interior space of the modular sensor system being configured to interface with the industrial machine.

13. The autonomous vehicle of claim 12, wherein the modular sensor system further comprises a surface panel configured to pivot around an axis of rotation from a first position that is perpendicular to the plurality of railings to a second position that is parallel to the plurality of railings, wherein the surface panel at least partially covers the interior space in the second position.

14. The autonomous vehicle of claim 10, wherein:
the plurality of railings comprise an attachment feature selected from at least one of: a cutout, a bracket, a groove, or a channel; and
the plurality of sensors are attached to the plurality of railings via the attachment feature.

15. The autonomous vehicle of claim 10, wherein:
the compartment body comprises an attachment feature selected from at least one of: a cutout, a bracket, a groove, or a channel; and
the plurality of sensors are attached to the compartment body via the attachment feature.

16. The autonomous vehicle of claim 15, wherein the compartment body comprise a transparent or near-transparent covering over the attachment feature.

17. The autonomous vehicle of claim 10, wherein the industrial machine is a forklift, and the modular sensor system is configured to be attached to a backwards-facing surface of the forklift behind a driver compartment.

18. The autonomous vehicle of claim 10, wherein the industrial machine is a stock chaser, and the modular sensor system is configured to be attached to the stock chaser along a top surface of the stock chaser.

19. A modular sensor system, comprising:
a plurality of railings comprising:
mounting slots or openings configured to facilitate attachment of the modular sensor system to an industrial machine; and
a plurality of markers configured to guide positioning of at least a portion of a plurality of sensors relative to the plurality of railings;

a compartment body coupled to the plurality of railings, the compartment body comprising an interior region and an exterior surface; and the plurality of sensors, wherein a portion of the plurality of sensors is positioned in the interior region or on the exterior surface of the compartment body, wherein the modular sensor system is configured to couple to the industrial machine via the plurality of railings or the compartment body.

* * * * *